Figure 1:
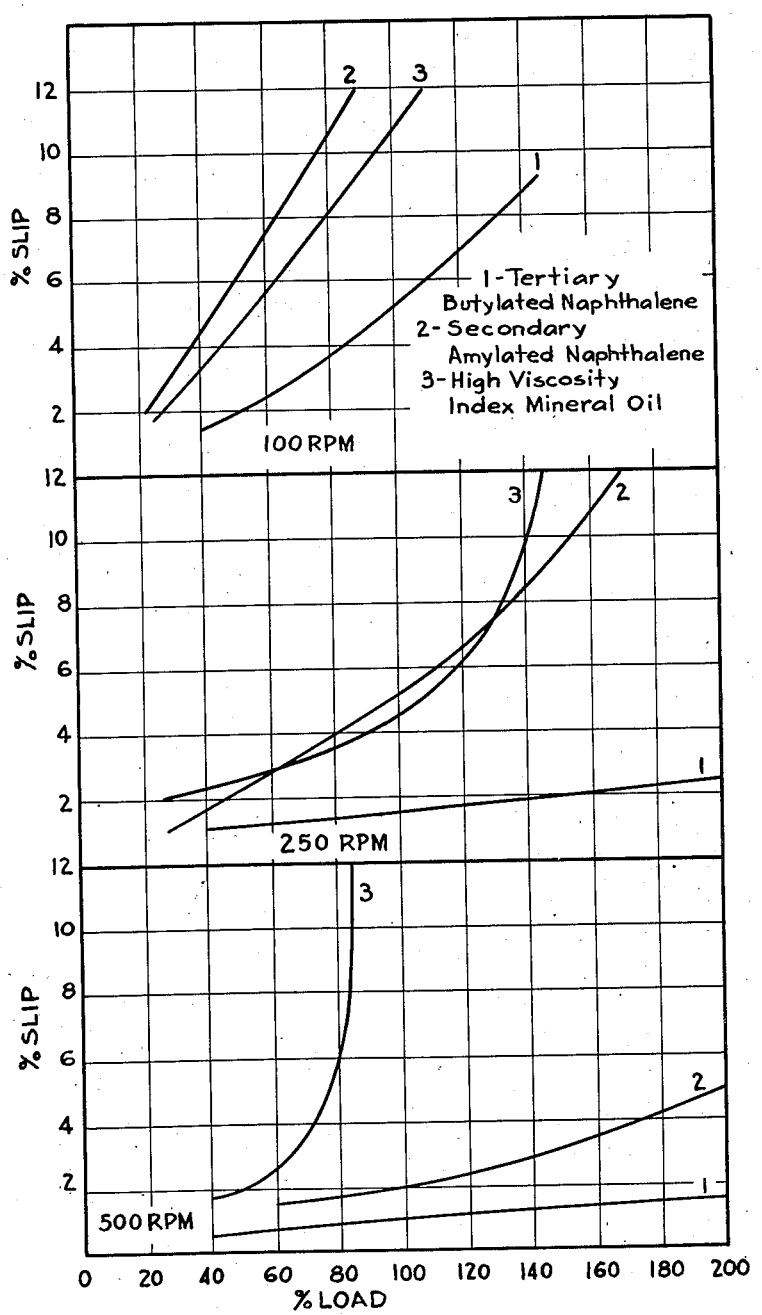

Jan. 20, 1953   S. K. TALLEY ET AL   2,626,242
TORQUE CONVERTER FLUID

Filed Oct. 25, 1948   2 SHEETS—SHEET 2

INVENTORS:
SAMUEL K. TALLEY
FORREST J. WATSON
BY: James Todorovic
THEIR ATTORNEY Patented Jan. 20, 1953

2,626,242

UNITED STATES PATENT OFFICE 2,626,242

TORQUE CONVERTER FLUID

Samuel K. Talley, Berkeley, and Forrest J. Watson, Oakland, Calif., assignors to Shell Development Company, San Francisco, Calif., a corporation of Delaware Application October 25, 1948, Serial No. 56,446

23 Claims. (Cl. 252—49.8)

This invention relates to a hydrocarbon oil especially suitable for the operation of friction drive torque converters, and to the method of operating such torque converters. More particularly, this invention is concerned with the use of certain tertiary alkylated naphthalenes for the lubrication and operation of friction gear transmission systems, and the like.

Friction gears depend for their driving action upon the friction of the driving wheel, or driver, against its mate or follower. Friction gears are used ordinarily for light and medium power in machinery which may be frequently started and stopped; also, such gears are employed where provision for a change of speed of the driving shaft or a reversed motion is necessary.

The usual disadvantages of friction gears are the thrust on the bearings and especially the slippage, these disadvantages resulting in a comparatively low efficiency unless they can be corrected. The driving capacity of friction gears is a function of the coefficient of friction between the surfaces in contact and of the pressure which holds them in contact.

One of the limiting features of friction gears up to the present time has been the unsatisfactory performance of lubricants or fluids used with them for their lubrication and prevention of wear. In the act of lubricating or preventing wear, a film of oil between the friction gear surfaces usually results in an increased slippage between the contact points of the surfaces of the engaging gears. As more fully explained hereinafter, and as shown by the accompanying diagrams, the per cent of slip increases drastically, and even prohibitively, with power input when ordinary high viscosity index mineral lubricating oils are employed.

The essential qualifications of a friction gear transmission fluid comprise especially a high coefficient of friction (which ordinary lubricants and oleaginous materials do not possess), and an extremely high thermal stability and resistance to oxidation, so as to minimize the necessity for fluid replacement. Another property which such fluids must exhibit is minimum sludging characteristics. Furthermore, bearings and gears in the same mechanism must be lubricated simultaneously.

It is an object of this invention to provide a fluid exhibiting remarkable performance in friction gear transmissions and the like. It is another object of this invention to provide a process for the operation of such mechanisms. It is a further object of this invention to provide a composition having improved properties for use as a friction gear transmission fluid.

Now, in accordance with this invention, it has been found that tertiary alkylated naphthalenes having on an average from 1 to 4 alkyl substituents, an average viscosity index of $-50$ to $-400$, and 90% of which naphthalenes boil within the range of from 200° C. to 500° C. at atmospheric pressure, or mixtures of such alkylated naphthalenes, constitute an outstanding lubricant for friction drive mechanisms, such as torque converters or transmissions. Still in accordance with this invention, it has been found that the addition of from about 1% to about 10%, by weight, of an organic ester of an acid of phosphorus materially improves the characteristics of the alkylated naphthalenes employed for this particular purpose.

It is known that the alkylation of naphthalenes can produce highly viscous oils. This alkylation may be carried out by reacting olefins or alkyl halides with naphthalenes in the presence of a suitable Friedel-Crafts catalyst. Such materials have been used for various purposes, such as the impregnation of cable oil wrappings. However the previously-employed compositions were either composed of a mixture of alkylated naphthalenes, including primary and secondary naphthalenes, or, in the specific use mentioned, they comprised highly viscous or semi-solid tertiary alkylated naphthalenes, preferably having viscosity indices of $-1000$ or even lower. In the present instance, as will be discussed fully hereinafter, outstanding results have been obtained with the use of tertiary alkylated naphthalenes having the properties described above. The heavier fractions which are suitable for cable oil purposes could not be used effectively for friction drive transmission fluids primarily due to their high pour points and correspondingly high viscosities.

The tertiary alkyl naphthalenes useful in the present invention can be produced by reacting, under known conditions, naphthalene with tertiary base olefins. Suitable olefins or their substitutes include, especially, those having from 4 to 12 carbon atoms, such as propylene dimer, trimer or tetramer, isobutylene, diisobutylene, triisobutylene, isoamylene, the so-called "hot-acid octylenes" produced by polymerizing isobutylenes with sulfuric acid, e. g., at about 70° C., tertiary alkyl chlorides, tertiary alcohols, etc. The ratio of alkyl groups to the naphthalene rings in the reactant product should be from 1:1 to 4:1 and preferably from 2:1 to 4:1.

To avoid excessive polymerization of olefins, if olefins are used for the alkylation of the naphthalene, it is desirable to add the latter to the mixture continuously or intermittently as the reaction proceeds. The temperature of reaction is preferably maintained between about 0° and 150° C., depending upon the alkylating agent used. When aluminum chloride is the catalyst, operating temperatures within the range of 35°–75° C. or preferably 40°–60° C., give a product having optimum properties. The amount of Friedel-Crafts catalyst employed is advantageously within the range of about 4%–6%, by weight of the naphthalene, although quantities from about 1% to about 15% may be used. Other alkylation catalysts, such as sulfuric or sulfonic acids, may also be employed if desired.

The oils produced in the reaction described above comprise mixtures of small amounts of polymerized olefins, unreacted naphthalene and various alkyl naphthalenes containing different numbers of tertiary alkyl side chains. These oils are subjected to fractionation, preferably under reduced pressure. In order to produce an oil suitable as a fluid in friction-gear transmissions, the fraction boiling below 200° C. at atmospheric pressure is removed. The remaining "bottoms" may be used without further treatment, or they may be further fractionated to obtain particularly suitable lubricants. In order to obtain a lubricant for the present purpose, the conditions of polymerization and distillation should be adjusted so that at least 90% of the product to be used in the friction drive mechanism boils within the range of from about 200° C. to about 500° C. at atmospheric pressure, preferably 250°–400° C. Hence, if the alkylation process has resulted in the production of substantial amounts of highly substituted alkylenes having a boiling point over 500° C., a "heart cut" should be taken, eliminating the fraction boiling below 200° C. and also a large proportion of the fractions boiling above 500° C.

The fraction boiling within the above-specified range has an average viscosity index (Dean and Davis) which should vary between −50 and −400, an average viscosity index of −100 to −200 being preferred. At ordinary room temperature, the viscosity of this fraction resembles very light lubricating oil, having an SAE number of less than 10.

The oils having the above properties, which oils are to be used for friction drive lubrication, are believed to consist predominantly of a mixture of normally fluid mono-tertiary alkyl naphthalenes, normally crystalline ditertiary alkyl naphthalenes and a minor amount of tertiary alkyl napthalenes of higher degrees of substitution. Various minor quantities of by-products of the reaction also may be present. If unreacted naphthalene remains in the product, no adverse effect is apparent if the quantity is below about 5–10%, by weight, and its presence actually appears to improve oxidation stability. A small proportion of polymerized olefins also may be present in the fluid. In lieu of the mixture of the aforementioned alkylated naphthalenes, the individual naphthalenes may also be used, provided they possess the aforementioned properties.

One of the outstanding properties of the oils described is their high oxidation stability in relation to primary or secondary alkyl naphthalenes and especially in relation to ordinary mineral oils. Under comparable conditions, the tertiary alkylated naphthalenes described will last for at least five times as long as a mineral oil of similar viscosity.

The property which appears to cause the outstanding performance of the described tertiary alkylated naphthalenes in friction drive mechanisms is their coefficient of friction under high load which prevents the slippage of the gears. This is demonstrated by the comparative tests whose results are shown in the accompanying graphs in Figure 1. Three oils were used as fluids in a ring and cone type of friction gear transmission. The torque load was increased progressively at various speeds from 100 to 500 revolutions per minute. The per cent of slippage of the gears was determined and plotted against the load causing the slip in the presence of the particular oil employed. The three oils used for this comparison were tertiary butylated naphthalenes, secondary amylated naphthalenes and a high viscosity index mineral oil. It will be noted by reference to the accompanying graphs that the tertiary alkylated naphthalenes exhibit outstanding qualities in their resistance to slip at all loads and speeds in comparison with the other oils tested. Numerous other examples of potential lubricants fall within the pattern shown for oils Nos. 2 and 3 as compared with the tertiary butylated naphthalenes.

Figure 2:
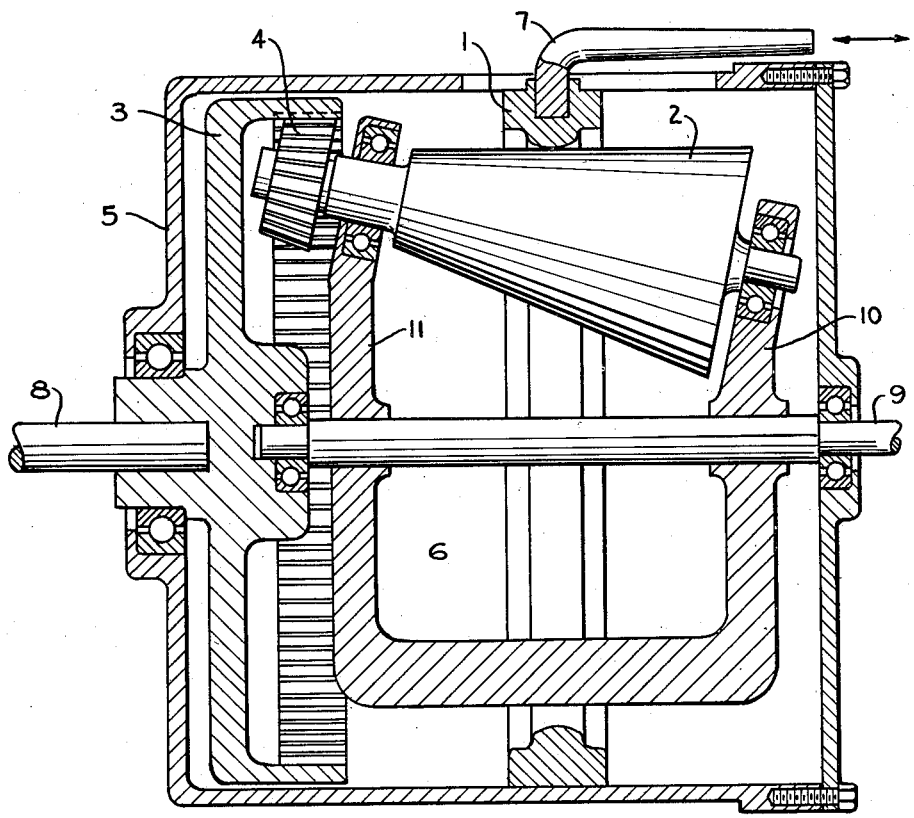

The accompanying diagram in Figure 2 represents a sectional view of a typical ring and cone type of friction gear transmission. The shaft 9 rotates and causes face plates 10 and 11 to rotate, carrying the cone 2 (one of three or more) around the common axis of shafts 8 and 9. The cone 2 rotates, on its own axis, against the ring 1. The ring 1, whose position is regulated by the shaft 7, constitutes the regulating member for the cone 2. The position of the ring with relation to the cone determines the speed at which the latter turns. The cone is connected with a gear 4, which travels in a ring gear 3 to form a planetary gear set 3 and 4. This gear is the rotating member which activates the shaft 8. The tertiary alkylated naphthalenes ordinarily are present in the space 6 and constitute the lubricant especially at the contact point of the ring and cone as well as for the contact points of the two gears and for the shafts at the points where they pass through the transmission casing 5.

The above description pertains to one particular embodiment of a ring and cone friction drive. Other types of friction gears with which the subject tertiary alkylated naphthalenes may be used include spur friction gear, bevel friction gears and disk friction gears, as well as combinations and variations thereof. The particular fluids described are also suitable for the lubrication of friction clutches of either the axial type or rim type. The clutches also require a lubricant having a high coefficient of friction under high load such as that possessed by the described tertiary alkylated naphthalenes.

The following examples give details for the preparation of two products which are suitable for use in the described invention.

*Example I*

Equimolecular amounts of naphthalene and diisobutylene were reacted with 6% of aluminum chloride (based on the naphthalene) within the temperature range 40° C.–65° C. The naphthalene was suspended as a slurry in a mixture of hexanes. The diisobutylene was gradually added together with the aluminum chloride at such a rate as to maintain a temperature below about 65° C. The reaction mixture was modified by the addition of dry HCl gas to activate the catalyst. The sludge was withdrawn at the end of the reaction period, and the oily layer remaining was caustic washed. Under reduced pressure, the lowest boiling constituents, which were principally water, hexanes, lower olefin polymers and some naphthalene, were removed to a top temperature corresponding to 200° C. at atmospheric pressure.

The product had a viscosity of 40 centistokes at 100° F. and a viscosity index of −110. The boiling range of 93% of the resulting product was 260° C. to 460° C.

*Example II*

The procedure described in Example I was followed except for the use of two mols of diisobutylene per mol of naphthalene. The product was more highly substituted than the product described in Example I and had a viscosity of 208 centistokes at 100° F. It had an average viscosity index of −185. Ninety per cent of the product boiled within the range 200° C.–400° C.

In accordance with one phase of the present invention, the described mixture of tertiary alkylated naphthalenes may be still further improved for the purpose of friction gear lubrication by the addition of 0.5–10% by weight of an organic ester of an acid of phosphorus. The preferred classes of such esters include the alkyl and aryl phosphates as well as mixed alkyl aryl phosphates, aralkyl and alkaryl phosphates. Particular species which have proven efficient include especially tricresyl phosphate, tributyl phosphate, trioctyl phosphate, triphenyl phosphate, trixylenyl phosphate, trinaphthyl phosphate and octyl diphenyl phosphates. The corresponding phosphites and thiophosphates are suitable as well.

The invention claimed is:

1. A power transmission assembly comprising a friction drive transmission and as a lubricant therefor a mixture of tertiary alkylated naphthalenes having an average alkyl substitution from 1:1 to 4:1, an average viscosity index of −50 to −400, at least 90% of said alkylated naphthalenes boiling within the range 200° C. to 500° C. at 760 mm. mercury pressure.

2. An assembly according to claim 1, wherein the friction drive is of the ring and cone type.

3. An assembly according to claim 1, wherein the naphthalenes are tertiary butylated naphthalenes.

4. A power transmission assembly comprising a friction drive transmission and as a lubricant therefor at least one tertiary alkylated naphthalene having an average alkyl substitution from 1:1 to 4:1, an average viscosity index of −50 to −400, at least 90% of said alkylated naphthalenes boiling within the range 200° C. to 500° C. at 760 mm. mercury pressure.

5. A friction gear lubricant comprising 90–99% by weight of tertiary alkylated naphthalenes having an average alkyl substitution from 1 to 4, an average viscosity index of −50 to −400, at least 90% of said alkylated naphthalenes boiling within the range 200° C. to 500° C. at 760 mm. mercury pressure, and 0.5–10% by weight of an organic ester of an acid of phosphorus.

6. A torque converter assembly comprising a friction gear torque converter and as a lubricant therefor a mixture of tertiary alkylated naphthalenes having an average alkyl substitution from 1:1 to 4:1, an average viscosity index of −50 to −400, at least 90% of said alkylated naphthalenes boiling within the range 200° C. to 500° C. at 760 mm. mercury pressure.

7. An assembly according to claim 1, wherein the friction drive is of the ring and cone type and wherein the alkyl groups of the tertiary alkylated naphthalenes contain from 4 to 12 carbon atoms each.

8. A power transmission assembly comprising a friction drive of the ring and cone type and as a lubricant therefor a mixture of tertiary butylated naphthalenes having an average alkyl substitution from 1:1 to 4:1, an average viscosity index of −50 to −400, at least 90% of said tertiary butylated napthalene boiling within the range 200° C. to 500° C. at 760 mm. mercury pressure.

9. A friction gear lubricant comprising 90–99% by weight of tertiary alkylated naphthalenes having an average alkyl substitution from 1 to 4, an average viscosity index of −50 to −400, at least 90% of said alkylated naphthalenes boiling within the range 200° C. to 500° C. at 760 mm. mercury and wherein the alkyl groups of said tertiary alkylated naphthalene contain from 4 to 12 carbon atoms each and 0.5–10% by weight of an organic ester of an acid of phosphorus.

10. A friction gear lubricant comprising 90–99% by weight of tertiary butylated naphthalenes having an average butyl substitution from 1 to 4, an average viscosity index from −50 to −400, at least 90% of said butylated naphthalenes boiling within the range from 200° C. to 500° C. at 760 mm. mercury pressure and from 0.5 to 10% by weight of an organic ester of an acid of phosphorus.

11. A friction gear lubricant comprising from 90 to 99% by weight of tertiary amylated naphthalenes having an average amyl substitution from 1 to 4, an average viscosity index from −50 to −400, at least 90% of said amylated naphthalenes boiling within the range from 200° C. to 500° C. at 760 mm. mercury pressure and from 0.5 to 10% by weight of an organic ester of an acid of phosphorus.

12. A friction gear lubricant comprising 90–99% by weight of tertiary alkylated naphthalenes having an average alkyl substitution from 1 to 4, an average viscosity index of −50 to −400, at least 90% of said alkylated naphthalenes boiling within the range from 200° C. to 500° C. at 760 mm. mercury pressure, and from 0.5 to 10% by weight of a tricresyl phosphate.

13. A friction gear lubricant comprising from 90 to 99% by weight of tertiary alkylated naphthalenes having an average alkyl substitution from 1 to 4, an average viscosity index of −50 to −400, at least 90% of said alkylated naphthalenes boiling within the range from 200° C. to 500° C. at 760 mm. mercury pressure, and 0.5–10% by weight of a trioctyl phosphate.

14. A friction gear lubricant comprising from 90 to 99% by weight of tertiary alkylated naphthalenes having an average alkyl substitution from 1 to 4, an average viscosity index of −50 to −400, at least 90% of said alkylated naphthalenes boiling within the range from 200° C. to 500° C. at 760 mm. mercury pressure, and from 0.5 to 10% by weight of a triphenyl phosphate.

15. A friction gear lubricant comprising 90–99% by weight of tertiary alkylated naphthalenes having an average alkyl substitution from 2 to 4, an average viscosity index of −50 to −400, at least 90% of said alkylated naphthalenes boiling within the range 200° C. to 500° C. at 760 mm. mercury pressure, and 0.5–10% by weight of an organic ester of an acid of phosphorus.

16. A friction gear lubricant comprising from 90 to 99% by weight of tertiary alkylated naphthalenes having an average alkyl substitution from 1 to 4, an average viscosity index of —50 to —400, at least 90% of said alkylated naphthalenes boiling within the range from 250–400° C. at 760 mm. mercury pressure, and from 0.5 to 10% by weight of an organic ester of an acid of phosphorus.

17. A friction gear lubricant comprising from 90 to 99% by weight of tertiary alkylated naphthalenes having an average alkyl substitution from 1 to 4, an average viscosity index of —100 to —200, at least 90% of said alkylated naphthalenes boiling within the range from 200° C. to 500° C. at 760 mm. mercury pressure, and from 0.5 to 10% by weight of an organic ester of an acid of phosphorus.

18. A power transmission assembly comprising a friction drive transmission and as a fluid therefor a composition according to claim 5.

19. A method for the operation of a friction drive transmission comprising maintaining therein during operation of said transmission a composition according to claim 5.

20. A method for the operation of a friction drive transmission comprising maintaining therein during operation of said transmission as the actuating fluid therefor a mixture of tertiary alkylated naphthalenes having an average alkyl substitution from 1:1 to 4:1, an average viscosity index of —50 to —400, at least 90% of said alkylated naphthalenes boiling within the range 200° C. to 500° C. at 760 mm. mercury pressure.

21. A friction gear lubricant comprising 90–99% by weight of tertiary alkylated naphthalenes having an average alkyl substitution from 1 to 4 per napthalene radical, said alkyl groups containing from 4 to 12 carbon atoms each, said alkylated naphthalenes having an average viscosity index of —100 to —200, at least 90% of said alkylated naphthalenes boiling within the range 250° C. to 400° C. at 760 mm. mercury pressure, and 0.5–10% by weight of a trihydrocarbyl phosphate.

22. A method for the operation of a friction drive transmission comprising maintaining therein during the operation of said transmission as the actuating fluid therefor a mixture of tertiary alkylated naphthalenes having an alkyl substitution of between 1 and 4 per naphthalene radical, each alkyl group containing from 4 to 12 carbon atoms, said alkylated naphthalenes having an average viscosity index of —100 to —200, at least 90% of said alkylated naphthalenes boiling within the range 250° C. to 400° C. at 760 mm. Hg pressure.

23. A power transmission assembly comprising a friction drive transmission and as a fluid therefor a mixture of tertiary alkylated naphthalenes having an average alkyl substitution between 1 and 4 alkyl radicals per naphthalene radical, each alkyl radical containing between 4 and 12 carbon atoms, said alkylated naphthalenes having an average viscosity index of —100 to —200, at least 90% of said alkylated naphthalenes boiling within the range 250° C. to 400° C. at 760 mm. Hg pressure.

SAMUEL K. TALLEY.
FORREST J. WATSON.

REFERENCES CITED

The following references are of record in the file of this patent:

UNITED STATES PATENTS

| Number | Name | Date |
|---|---|---|
| 2,203,102 | Powers | June 4, 1940 |
| 2,355,993 | Morgan | Aug. 15, 1944 |
| 2,427,766 | Diamond | Sept. 23, 1947 |
| 2,436,110 | Larsen | Feb. 17, 1948 |
| 2,491,120 | Loane | Dec. 13, 1949 |